United States Patent [19]

Murata et al.

[11] Patent Number: 4,976,514
[45] Date of Patent: Dec. 11, 1990

[54] LIQUID CRYSTAL DISPLAY DEVICE

[75] Inventors: Yasushi Murata; Satoru Tanaka, both of Saitama, Japan

[73] Assignee: Pioneer Electronic Corporation, Tokyo, Japan

[21] Appl. No.: 309,129

[22] Filed: Feb. 13, 1989

[30] Foreign Application Priority Data

Aug. 3, 1988 [JP] Japan .................................. 63-193734

[51] Int. Cl.$^5$ .......................... G02F 1/13; G02B 5/22; F21V 7/04
[52] U.S. Cl. ..................................... 350/345; 350/1.1; 350/334; 350/339 R; 362/31; 362/84; 362/260
[58] Field of Search ................. 350/345, 338, 1.5, 1.6, 350/339 F, 1.1, 334; 362/31, 84, 222, 260

[56] References Cited

U.S. PATENT DOCUMENTS

| 4,011,001 | 3/1977 | Moriya | 350/345 |
| 4,389,452 | 6/1983 | Chabroudi et al. | 350/1.1 X |
| 4,470,666 | 9/1984 | Eick | 350/339 F |
| 4,648,690 | 3/1987 | Ohe | 362/31 X |
| 4,678,285 | 7/1987 | Ohta et al. | 350/345 |

OTHER PUBLICATIONS

"Fluorescent Plastic Light Source Brightens LCD", Electronic, vol. 50, No. 12, Jun. 9, 1977.
Bour et al, "Fluorescence-Activated Liquid Crystal Display", Appl. Phys. Letter, vol. 31, No. 1, Jul. 1, 1977.
Sato et al, "Multicolor Fluorescent Liquid Crystal Display Concepts", Appl. Phys. Lett., vol. 37, No. 8, Oct. 15, 1980.

Primary Examiner—Stanley D. Miller
Assistant Examiner—Huy K. Mai
Attorney, Agent, or Firm—Foley & Lardner, Schwartz, Jeffery, Schwaab, Mack, Blumenthal & Evans

[57] ABSTRACT

A liquid crystal display device includes a light-responsive fluorescent screen that luminenesces at least one kind of visible light when activated by a U.V. light impinging on the screen. The device further includes a liquid crystal cell disposed in front of the luminous surface of the fluorescent screen and an irradiating device for impinging the active light onto the fluorescent screen so as to enable the display device to display a two dimensional image at a high speed with a high quality even though it uses a simple matrix address driving system for the liquid crystal cell. The display device incorporates an intercepting layer composed of glass plate or plastic film which intercepts black light discharged from the fluorescent screen to prevent the leakage of harmful U.V. rays to the outside of the display device.

7 Claims, 2 Drawing Sheets

LIQUID CRYSTAL DISPLAY DEVICE

BACKGROUND OF THE INVENTION

1. Field of the Invention

The present invention relates to a display device using a liquid crystal cell.

2. Description of the prior art

A known liquid crystal display device adopts a so-called active matrix address driving system which drives the liquid crystal cell by means of an active element per each of picture element in order to display an image with high quality and responsiveness. However, the liquid crystal display device using such an active matrix address driving system is more costly than that with a simple matrix address driving system in which the liquid crystal cell is simply disposed between two groups of stripe electrodes confronting to each other in the form of a matrix. Furthermore, those active elements should constitute a group of MOS transistors and thin-film transistors some of which are defective in practice.

SUMMARY OF THE INVENTION

An object of the present invention is to provide a liquid crystal display device capable of displaying an image at a high quality with a high responsiveness while using the simple matrix address driving system.

The liquid crystal display device according to the present invention comprises a light-responsive fluorescent screen that luminesces at least one kind of visible light when activated by a U.V. light impinging on the screen a liquid crystal cell disposed in front of the luminous surface of the fluorescent screen, and irradiating means for impinging the active light onto the fluorescent screen.

DESCRIPTION OF THE PREFERRED EMBODIMENTS

An embodiment according to the present invention will be explained while referring to the accompanying drawings hererinafter.

Figure 1:
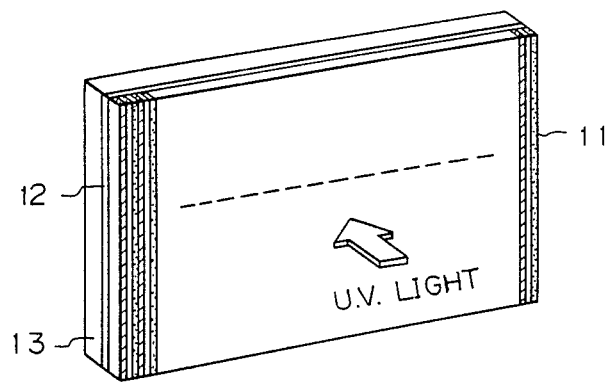
FIG. 1 is a perspective view of the liquid crystal display device according to the present invention.
Figure 4:
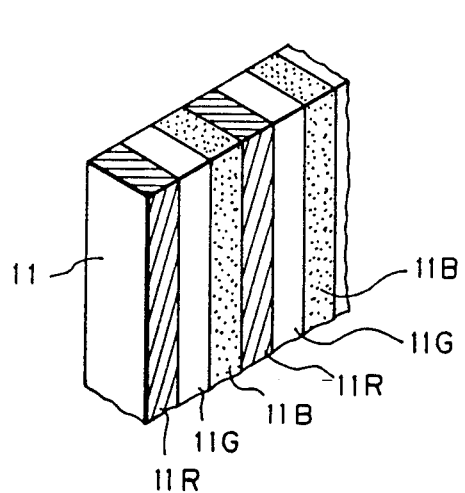
FIG. 4 is an enlarged perspective view of the fluorescent screen formed from fluorescent strips.

FIG. 1 shows a liquid crystal display device having a light-responsive fluorescent screen 11 which luminesces a visible light when activated by a U.V. light ray such as a so-called black light having a wavelength of about 365 nm impinged thereonto. The fluorescent screen 11 is formed from a plurality of strips 11R, 11G and 11B respectively containing red, green and blue fluorescent substances and arranged in turn to form a striped pattern as seen in FIG. 4. The red, green and blue fluorescent strips 11R, 11G and 11B respectively luminesce the red, green and blue light when activated by the irradiation of the black light. The red, green and blue fluorescent substances may be respectively yttrium oxides, a mixture of zinc oxides and germanium oxides, and boron calcium oxides.

Figure 2:
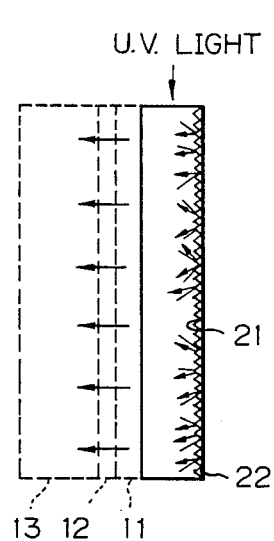
FIG. 2 is a sectional view of a light conducting plate for impinging a U.V. light ray onto the fluorescent screen.

The black light is uniformly impinged onto the back face of the fluorescent screen 11 from irradiating means, as seen in FIG. 1. As seen in FIG. 2, the irradiating means for impinging the black light onto the fluorescent screen 11 is a light conducting plate 22 disposed at the back face of the fluorescent screen 11 and having an irregular reflecting inner surface 21 in the back face thereof. The light conducting plate 22 receives the black light at the peripheral side face thereof to uniformly transmit the black light onto the back face of the fluorescent screen 11 through the diffused reflection effect of the irregular reflecting inner surface 21.

Figure 3:
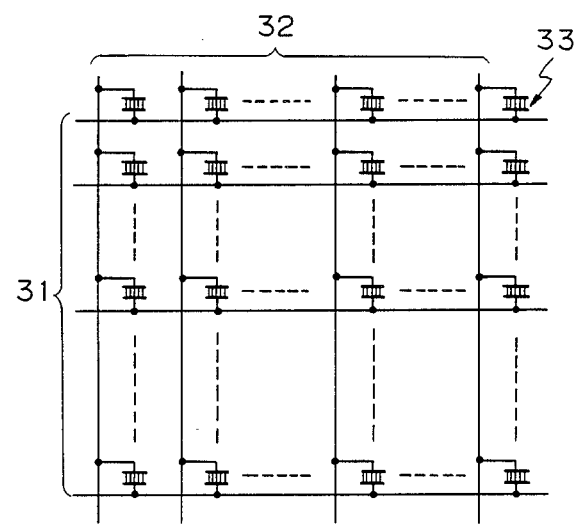
FIG. 3 is a circuit diagram representing a liquid crystal cell with the simple matrix address driving system.

As seen in FIG. 1 a liquid crystal cell 13 is disposed on the front face or irradiating face of the fluorescent screen 11 via a U.V. light interception layer 12. The intercepting layer 12 is made of a glass plate or plastic film which intercept or absorb the black light discharged from the fluorescent screen 11 to prevent the black light from impinging the liquid crystal cell 13 which is weak to the U.V. light and from leaking to the outside. The liquid crystal cell 13 has a group of scan electrodes 31 and another group of signal electrodes 32, each electrode being shaped into a strip. The scan electrodes 31 are parallel to each other but perpendicular to the signal electrodes 32 which are parallel to each other. A liquid crystal layer 33 is disposed between the scan electrodes 31 and the signal electrodes 32 so as to form a matrix of light switches as shown in FIG. 3. This construction is called a "simple matrix address driving system". Each of the light switches functions as a shutter for passing or intercepting the light radiating from the fluorescent screen 11 in response to a voltage across the electrodes 31 and 32.

Since the liquid crystal cell 13 is disposed in front of the luminous surface of the fluorescent screen 11, each picture element of the cell 13 radiates a visible light by itself. The liquid crystal display device is therefore capable of displaying at a high speed a color image with a high quality and high contrast even though the cell 13 is monochromic and driven by the simple matrix address driving system.

Figure 5:
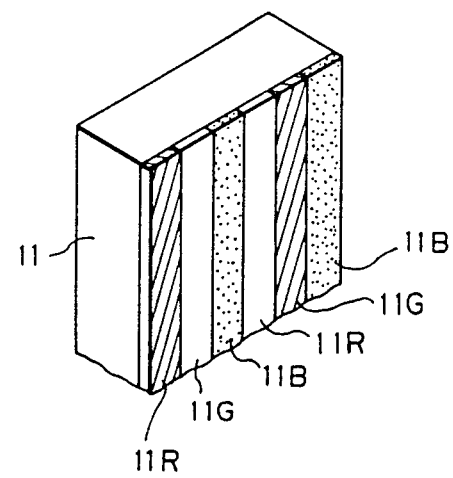
FIG. 5 is an enlarged perspective view of the fluorescent screen printed or coated with fluorescent inks.
Figure 6:
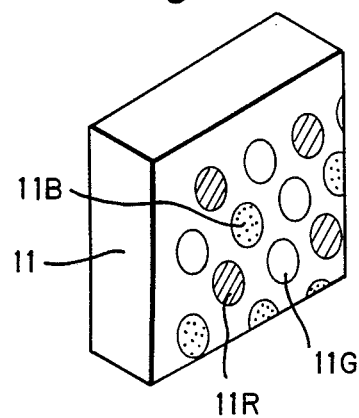
FIG. 6 is an enlarged perspective view of the fluorescent screen printed or coated with fluorescent inks in a form of delta dots illuminating in red, green and flue respectively.

The fluorescent screen 11 made of the red, green and blue fluorescent strips may be replaced by fluorescent layers formed on a glass plate or film in the form of delta dots, as shown in FIG. 6, or stripe patterns by a printing or coating method, as shown in FIG. 5.

The fluorescent screen 11 may be formed by visible light responsive fluorescent substances which respectively emit red, green and blue light when activated by a visible white light as an active light. The U.V. light above mentioned is also one of active lights which activate fluorescent substances. In this case, the intercepting film 12 can be omitted from the liquid crystal display device.

It should be noted that the fluorescent screen may be formed by only one kind of fluorescent substance emitting a monochromic light ray for the monochromic display.

As mentioned above, the liquid crystal display device according to the present invention comprises a light-responsive fluorescent screen that luminesces at least one kind of visible light when activated by a U.V. light impinging on the screen and a liquid crystal cell disposed in front of the luminous surface of the fluorescent screen. The liquid crystal display device is therefore capable of displaying a two-dimensional image at a high speed with a high quality even though using the simple matrix address driving system.

What is claimed is:

1. A liquid crystal display device comprising:
   (a) a light responsive fluorescent screen that luminesces at least one kind of visible light when activated by a U.V. light impinging on said screen;
   (b) an intercepting layer means disposed in front of the surface of said fluorescent screen for intercepting U.V. light discharging from said fluorescent screen so as to prevent said U.V. light form leaking outside of said display device; and
   (c) a liquid crystal cell disposed in front of the surface of said intercepting layer means.

2. A liquid crystal display device according to claim 1 wherein said fluorescent screen is formed by a plurality of light-responsive fluorescent regions arranged in such a pattern that neighboring regions luminesce different visible colors from each other.

3. A liquid crystal display device according to claim 2 wherein said pattern is made of stripes or delta dots being capable of illuminating in red, green and blue respectively.

4. A liquid crystal display device comprising:
   (a) a light responsive fluorescent screen that luminesces at least one kind of visible light when activated by a U.V. light impinging on said screen;
   (b) an intercepting layer means disposed in front of the surface of said fluorescent screen for intercepting U.V. light discharging from said fluorescent screen so as to prevent U.V. light from leaking to the outside of the display device;
   (c) a liquid crystal cell disposed in front of the surface of said intercepting layer means; and
   (d) irradiating means disposed in the back surface of said fluorescent screen for impinging said U.V. light onto said fluorescent screen.

5. A light crystal display device according to claim 4 wherein said fluorescent screen is formed by a plurality of light-responsive fluorescent regions arranged in such a pattern that neighboring regions luminesce different visible colors from each other.

6. A liquid crystal display device according to claim 5 wherein said pattern is made of stripes or delta dots being capable of illuminating in red, green and blue respectively.

7. A liquid crystal display device according to claim 4 wherein said irradiating means includes a light-permeable plate disposed at the back face of said fluorescent screen and having an irregular reflecting inner surface in the back face thereof, for converting a light beam applied to the side surface thereof of a two-dimensional light beam uniformly impinging the back face of said fluorescent screen at once.

* * * * *